(12) United States Patent
Strandberg

(10) Patent No.: US 10,006,533 B1
(45) Date of Patent: Jun. 26, 2018

(54) DRIVE MODULE WITH PARALLEL INPUT AXES FOR PROPULSIVE AND TORQUE-VECTORING INPUTS

(71) Applicant: e-AAM Driveline Systems AB, Trollhättan (SE)

(72) Inventor: Mats Strandberg, Göteborg (SE)

(73) Assignee: e-AAM Driveline Systems AB, Trollhättan (SE)

( * ) Notice: Subject to any disclaimer, the term of this patent is extended or adjusted under 35 U.S.C. 154(b) by 0 days. days.

(21) Appl. No.: 15/427,314

(22) Filed: Feb. 8, 2017

(51) Int. Cl.
F16H 48/08 (2006.01)
F16H 48/36 (2012.01)

(52) U.S. Cl.
CPC ............. *F16H 48/36* (2013.01); *F16H 48/08* (2013.01); *F16H 2048/364* (2013.01)

(58) Field of Classification Search
None
See application file for complete search history.

(56) References Cited

U.S. PATENT DOCUMENTS

| 7,115,058 | B2 | 10/2006 | Duncan | |
|---|---|---|---|---|
| 8,663,051 | B2 | 3/2014 | Sten | |
| 2005/0028627 | A1* | 2/2005 | Fleytman | F16H 1/08 74/416 |
| 2005/0054471 | A1* | 3/2005 | Fleytman | B60K 17/16 475/226 |
| 2006/0079370 | A1* | 4/2006 | Kushino | B60K 6/365 475/221 |
| 2010/0234162 | A1* | 9/2010 | Troennberg | B60K 6/52 475/223 |
| 2012/0058855 | A1 | 3/2012 | Sten | |
| 2014/0274538 | A1* | 9/2014 | Ziech | B60K 17/36 475/198 |
| 2014/0357445 | A1* | 12/2014 | Brooks | F16H 48/10 475/225 |
| 2016/0116048 | A1* | 4/2016 | Yu | F16C 33/581 74/434 |
| 2016/0176182 | A1* | 6/2016 | Bell | B41F 13/008 101/375 |
| 2016/0207396 | A1* | 7/2016 | Pritchard | B60K 17/02 |
| 2016/0236567 | A1* | 8/2016 | Uchida | B60K 17/344 |

FOREIGN PATENT DOCUMENTS

WO WO-2008/154675 A1 12/2008

* cited by examiner

*Primary Examiner* — Justin Holmes
(74) *Attorney, Agent, or Firm* — Harness, Dickey & Pierce, P.L.C.

(57) ABSTRACT

A drive module with a first input, which receives rotary power from a first power source, and a second input that receives rotary power from a second power source. Rotary power from the first power source is transmitted to a differential assembly to drive a pair of vehicle wheels. Rotary power is selectively provided by the second power source to provide the drive module with torque-vectoring capabilities in which equal but opposite moments are applied to the vehicle wheels. The axes of the first input and the second input are parallel one another.

6 Claims, 2 Drawing Sheets

DRIVE MODULE WITH PARALLEL INPUT AXES FOR PROPULSIVE AND TORQUE-VECTORING INPUTS

FIELD

Figure 1:
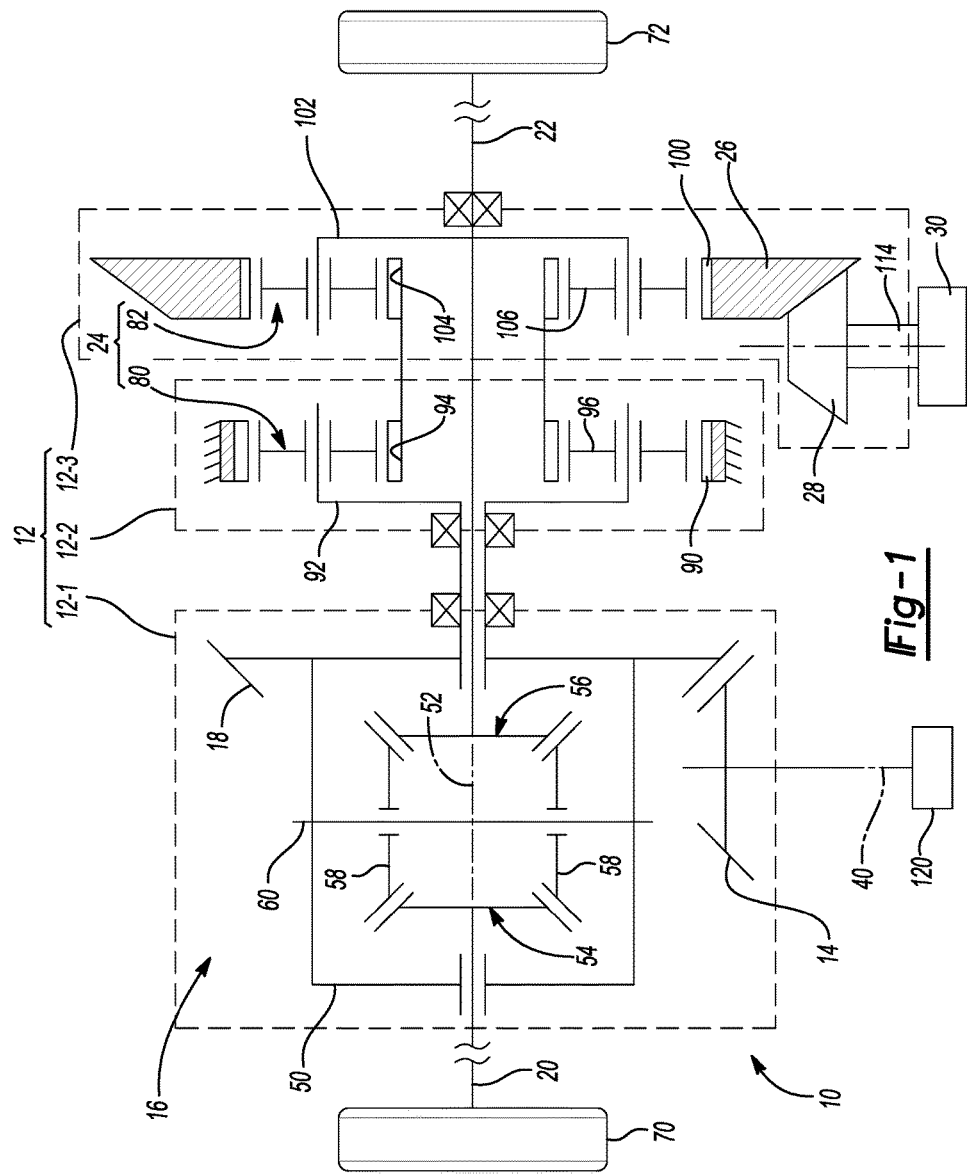

The present disclosure relates to a drive module for an automotive vehicle having parallel input axes for propulsive and torque-vectoring inputs.

BACKGROUND

This section provides background information related to the present disclosure which is not necessarily prior art.

U.S. Patent Application Publication No. 2012/0058855 discloses a drive module with a first input, which receives rotary power from a first power source, and a second input that receives rotary power from a second power source. Rotary power from the first power source is transmitted to a differential assembly to drive a pair of vehicle wheels. Rotary power is selectively provided by the second power source to provide the drive module with torque-vectoring capabilities in which equal but opposite moments are applied to the vehicle wheels. Because the first and second power sources are transverse to one another, the solution disclosed in U.S. Patent Application Publication No. 2012/0058855 can be difficult to package into some vehicles. Accordingly, there remains a need in the art for an improved drive module that is more easily packaged into a vehicle.

SUMMARY

This section provides a general summary of the disclosure, and is not a comprehensive disclosure of its full scope or all of its features.

In one form, the present teachings provide drive module that includes a housing assembly, an input pinion, a differential assembly, a differential ring gear, first and second axle shafts, a transmission, first and second bevel gears and an electric motor. The input pinion is received in the housing assembly and is rotatable about a first axis. The differential assembly is received in the housing assembly and includes a differential input, which is rotatable about a second axis that is not parallel to the first axis, and first and second differential outputs that are rotatable about the second axis. The differential ring gear is coupled to the differential input for rotation therewith and is meshingly engaged with the input pinion. The first and second axle shafts are drivingly coupled to the first and second differential outputs, respectively. The transmission is received in the housing assembly and has first and second planetary gearsets. The first planetary gearset has a first ring gear, a first planet carrier, a first sun gear and a plurality of first planet gears. The first planet carrier is coupled to the differential input for common rotation. The first planet gears are rotatably supported by the first planet carrier and are drivingly engaged with the first ring gear and the first sun gear. The second planetary gearset has a second ring gear, a second planet carrier, a second sun gear and a plurality of second planet gears. The second sun gear is coupled to the first sun gear for rotation therewith. The second planet carrier is coupled to the second axle shaft for rotation therewith. The second planet gears are rotatably supported by the second planet carrier and are drivingly engaged with the second ring gear and the second sun gear. One of the first and second ring gears is rotatable relative to the housing assembly while the other one of the first and second ring gears is non-rotatably coupled to the housing assembly. The first bevel gear is coupled to the one of the first and second ring gears for rotation therewith. The second bevel gear is meshed with the first bevel gear and is rotatable about a third axis that is parallel to the first axis. The electric motor is drivingly coupled to the second bevel gear.

According to a further embodiment of the invention, the differential input can further include a differential case and the differential assembly can further include a plurality of differential pinions that are meshingly engaged with the first and second differential outputs.

According to a further embodiment of the invention, each of the first planet gears is meshingly engaged with the first ring gear.

According to a further embodiment of the invention, each of the second planet gears is meshingly engaged with the second ring gear.

According to a further embodiment of the invention, the first bevel gear is a straight bevel gear.

According to a further embodiment of the invention, the first bevel gear is a spiral bevel gear. Optionally, the first and second bevel gears can be hypoid gears.

According to a further embodiment of the invention, the input pinion is a spiral bevel gear. Optionally, the input pinion and the differential ring gear are hypoid gears.

According to a further embodiment of the invention, the electric motor is drivingly coupled to the second bevel gear through a reduction gearset.

According to a further embodiment of the invention, the input pinion and the second bevel gear are disposed on a common longitudinal side of the differential assembly.

According to a further embodiment of the invention, the second axis is disposed vertically between the first and third axes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
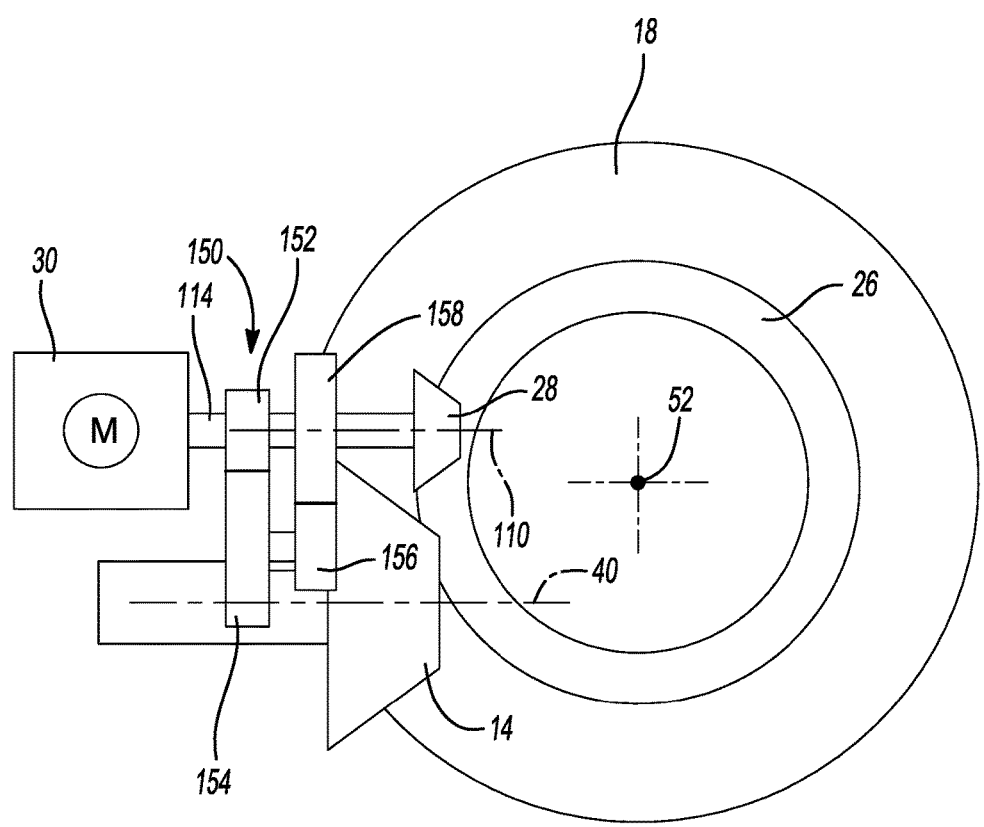

FIG. 1 is a schematic cross-sectional view of a drive module according to the teachings of the present disclosure; and FIG. 2 is a schematic side view illustrating another drive module according to the teachings of the present disclosure.

Corresponding reference numerals indicate corresponding parts throughout the several views of the drawings.

DETAILED DESCRIPTION

With reference to FIG. 1 of the drawings, a drive module constructed in accordance with the teachings of the present disclosure is generally indicated by reference numeral 10. The drive module 10 can include a housing assembly 12, an input pinion 14, a differential assembly 16, a differential ring gear 18, first and second axle shafts 20 and 22, respectively, a transmission 24, a first bevel gear 26, a second bevel gear 28 and an electric motor 30.

In the example provided, the housing assembly 12 comprises a plurality of discrete housing members 12-1, 12-2 and 12-3 that are coupled together. It will be appreciated, however, that the housing assembly 12 could be configured with any number of discrete housing members.

The input pinion 14 can be received in the housing assembly 12 and can be rotatable about a first axis 40.

The differential assembly 16 can be received in the housing assembly 12 and can include a differential input 50, which is rotatable about a second axis 52 that is not parallel to the first axis 40, and first and second differential outputs 54 and 56, respectively, that are rotatable about the second axis 52. In the example provided, the differential input 50 is a differential case that defines a cavity into which a plurality of differential pinions 58 are received. The differential pinions 58 are journally mounted to a cross-pin 60 that is mounted to the differential input 50 and which extends perpendicular to the second axis 52. The differential pinions 58 can be meshingly engaged to the first and second differential outputs 54 and 56, which are side gears in the example that is illustrated.

The differential ring gear 18 is coupled to the differential input 50 for rotation therewith. The differential ring gear 18 is meshingly engaged to the input pinion 14. The differential ring gear 18 and the input pinion 14 can be any type of bevel gear, such as straight or spiral bevel gears. Moreover, the differential ring gear 18 and the input pinion 14 can be hypoid gears.

The first axle shaft 20 can be drivingly coupled to the first differential output 54 and to a first vehicle wheel 70. The second axle shaft 22 can be drivingly coupled to the second differential output 56 and a second vehicle wheel 72.

The transmission 24 can be received in the housing assembly 12 and can have first and second planetary gearsets 80 and 82, respectively. The first planetary gearset 80 can have a first ring gear 90, a first planet carrier 92, a first sun gear 94 and a plurality of first planet gears 96. The first planet carrier 92 can be coupled to the differential input 50 for common rotation. The first planet gears 96 can be rotatably supported by the first planet carrier 92 and can being drivingly engaged with the first ring gear 90 and the first sun gear 94. In the example provided, each of the first planet gears 96 is meshingly engaged with both the first ring gear 90 and the first sun gear 94. The second planetary gearset 82 can have a second ring gear 100, a second planet carrier 102, a second sun gear 104 and a plurality of second planet gears 106. The second sun gear 104 can be coupled to the first sun gear 94 for rotation therewith. The second planet carrier 102 can be coupled to the second axle shaft 22 for rotation therewith. The second planet gears 106 can be rotatably supported by the second planet carrier 102 and can be drivingly engaged with the second ring gear 100 and the second sun gear 104. In the example provided, the second planet gears 106 are meshingly engaged with both the second ring gear 100 and the second sun gear 104. One of the first and second ring gears 90 and 100 is rotatable relative to the housing assembly 12 and the other one of the first and second ring gears 90 and 100 is non-rotatably coupled to the housing assembly 12. In the particular example provided, the first ring gear 90 is non-rotatably coupled to the housing assembly 12 and the second ring gear 100 is rotatable relative to the housing assembly 12, but it will be appreciated that the first ring gear 90 could be rotatable relative to the housing assembly 12 and that the second ring gear 100 could be non-rotatably coupled to the housing assembly 12.

The first bevel gear 26 is coupled to the one of the first and second ring gears 90 and 100 for rotation therewith. In the example provided, the first bevel gear 26 is coupled to the second ring gear 100 for rotation therewith.

The second bevel gear 28 can be meshed with the first bevel gear 26 and is rotatable about a third axis 110 that is parallel to the first axis 40. The first and second bevel gears 26 and 28 can be any type of bevel gear, such as straight bevel gears or spiral bevel gears, and can be hypoid gears. The electric motor 30 has an output shaft 114 that is drivingly coupled to the second bevel gear 28.

In operation, propulsive power can be input to the drive module 10 via the input pinion 14. In this regard, rotary power from an electric propulsion motor or an internal combustion engine 120 can be transmitted to the input pinion 14 in a conventional and well known manner to drive the first and second vehicle wheels 70 and 72. The electric motor 30 is normally not operated and as such, the differential assembly 16 can operate in its usual manner. In the example provided, the differential assembly 16 is an open differential, but it will be appreciated that other types of differential assemblies, such as an electronically-locking differential assembly could be employed.

The electric motor 30 can be operated if torque-vectoring capabilities are desired (e.g., to help correct oversteer). The electric motor 30, which is a reversible motor, can be rotated to input rotary power to the transmission 24. The transmission operates to apply equal but oppositely directed moments to the first and second vehicle wheels 70 and 72.

With reference to FIG. 2, the electric motor 30 can be drivingly coupled to the second bevel gear 28 through a reduction gearset 150. In the particular example provided, the reduction gearset 150 comprises a plurality of spur gears 152, 154, 156 and 158. The spur gear 152 is coupled to the output shaft 114 of the electric motor 30 for rotation therewith. The spur gear 154 is meshingly engaged with the spur gear 152. Due to the difference in their sizes, the spur gears 152 and 154 provide a first intermediate gear reduction. The spur gear 156 is coupled to the spur gear 154 for rotation therewith and is meshed with the spur gear 158, which is coupled to the second bevel gear 28 for rotation therewith. A second intermediate gear reduction is provided by the spur gears 156 and 158 due to the difference in their sizes. It will be appreciated that the reduction gearset 150 can be configured to provide a desired overall gear reduction between the electric motor 30 and the second bevel gear 28, as well as to provide flexibility in the orientation of the third axis 110. In the example provided, the second axis 52 is disposed vertically between the first axis 40 and the third axes 110.

In the examples provided, the input pinion 14 and the second bevel gear 28 have been illustrated as being disposed on a common longitudinal side of the differential assembly 16. It will be appreciated that in the alternative, the input pinion 14 and the second bevel gear 28 can be disposed on opposite longitudinal sides of the differential assembly 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module comprising:
  a housing assembly;
  an input pinion received in the housing assembly and rotatable about a first axis;

a differential assembly received in the housing assembly, the differential assembly having a differential input, which is rotatable about a second axis that is not parallel to the first axis, and first and second differential outputs that are rotatable about the second axis;

a differential ring gear coupled to the differential input for rotation therewith, the differential ring gear being meshingly engaged with the input pinion;

a first axle shaft drivingly coupled to the first differential output;

a second axle shaft drivingly coupled to the second differential output;

a transmission received in the housing assembly and having first and second planetary gearsets, the first planetary gearset having a first ring gear, a first planet carrier, a first sun gear and a plurality of first planet gears, the first planet carrier being coupled to the differential input for common rotation, the first planet gears being rotatably supported by the first planet carrier and being drivingly engaged with the first ring gear and the first sun gear, the second planetary gearset having a second ring gear, a second planet carrier, a second sun gear and a plurality of second planet gears, the second sun gear being coupled to the first sun gear for rotation therewith, the second planet carrier being coupled to the second axle shaft for rotation therewith, the second planet gears being rotatably supported by the second planet carrier and being drivingly engaged with the second ring gear and the second sun gear, wherein one of the first and second ring gears is rotatable relative to the housing assembly and the other one of the first and second ring gears is non-rotatably coupled to the housing assembly;

a first bevel gear coupled to the one of the first and second ring gears for rotation therewith;

a second bevel gear meshed with the first bevel gear and rotatable about a third axis that is parallel to the first axis; and an electric motor drivingly coupled to the second bevel gear;

wherein the first and second bevel gears are hypoid gears, wherein the input pinion and the differential ring gear are hypoid gears, and wherein the second axis is disposed vertically between the first and third axes.

2. The drive module of claim 1, wherein the differential input comprises a differential case and wherein the differential assembly further comprises a plurality of differential pinions that are meshingly engaged with the first and second differential outputs.

3. The drive module of claim 1, wherein each of the first planet gears is meshingly engaged with the first ring gear.

4. The drive module of claim 1, wherein each of the second planet gears is meshingly engaged with the second ring gear.

5. The drive module of claim 1, wherein the electric motor is drivingly coupled to the second bevel gear through a reduction gearset.

6. The drive module of claim 1, wherein the input pinion and the second bevel gear are disposed on a common longitudinal side of the differential assembly.

* * * * *